Patented May 30, 1939

2,160,107

UNITED STATES PATENT OFFICE 2,160,107

PROCESS FOR PREPARING CELLULOSE DERIVATIVES

Robert W. Maxwell and Joseph Harrel Shipp, Wilmington, Del., assignors to E. I. du Pont de Nemours & Company, Wilmington, Del., a corporation of Delaware No Drawing. Application December 21, 1937, Serial No. 181,054

8 Claims. (Cl. 260—231)

This invention relates to the preparation of low-substituted cellulose ethers, and more particularly to a process of preparing low-substituted cellulose ethers wherein the degree of degradation during etherification is controlled to produce ethers of a high and uniform degree of polymerization.

The common method of making cellulose ethers consists of steeping sheets of cellulose in a caustic solution, pressing out the excess solution, shredding the cellulose and adding the etherifying agent. Shredding generally continues during the entire course of the reaction, though not always. The process of adding the etherifying agent to the steeping bath is also known, and when this process is used the cellulose may be shredded or left in sheet form after pressing out the excess solution. But in all these cases the reaction mixture exists as a very porous springy mass much like cotton itself. Because of its porous bulky nature it contains large portions of air in the interstices between fibers and consequently oxidation accompanies the etherification reaction, and unless the etherification reaction is fairly rapid this concurrent oxidation will result in high degradation before the etherification reaction is substantially complete. As a result it is possible to produce only a highly degraded non-uniform product which is of correspondingly low viscosity (for, as a general rule, the viscosity of a cellulose derivative varies inversely to the degree of degradation).

Attempts have been made to control oxidation by displacing air in the reaction mass with an inert gas, but this process is impractical for producing any appreciable quantities of cellulose ethers. It is practically impossible to displace all of the air in a reaction mixture with a gas such as nitrogen without first evacuating the reaction mixture followed by introduction of nitrogen and repeating the operation several times. Unless this is done, products of non-uniform degrees of degradation are obtained. Furthermore, this procedure does not permit of controlled oxidation within appreciable limits.

It has been proposed also to control degradation by limitation of the time during which air is allowed to act on the alkali cellulose reaction mixture. Control in this fashion is also unsatisfactory, for here degradation by oxidation is incidental to the substituting reaction itself and has not been susceptible to independent control. Thus, where the etherifying reaction takes a shorter time than is necessary to attain the required degree of degradation, the degrading reaction must be continued beyond the time required for the reaction. Where the time required for the etherification reaction is greater than the time required for degradation, no remedy has been available, and the resulting products are unavoidably of a high degree of degradation and of inferior physical characteristics.

Control of the degree of degradation of a cellulose derivative during its preparation is an exceedingly important matter, for the degree of depolymerization of the cellulose structure of the derivative governs to a large degree the physical characteristics and utility of the resulting cellulose compound. Thus, cellulose ethers in which the cellulose nucleus has been badly degraded vary in viscosity of their solutions and in tensile strength, elongation and elasticity of formed objects prepared from them. Furthermore, variations in degree of degradation also bring about variations in the physical properties just described. So that in order that mechanical characteristics of the derivatives may be reproducible, the extent of depolymerization of the derivative must also be reproducible. The degree of polymerization of a cellulose derivative is best reflected in the viscosity of its solutions. In the case of alkali soluble low-substituted cellulose ethers, products of substantially the same degree of polymerization give aqueous caustic soda solutions of substantially the same viscosity. In the case of cellulose ethers which are substituted to such a low extent that they do not dissolve even in chilled aqueous caustic soda, their cuprammonium solutions may be taken as an index of depolymerization. In the case of the alkali-soluble cellulose ethers, the degree of degradation is also reflected in the solubility of the ethers in caustic soda solutions. As the depolymerization varies, solubility also varies. Careful control of the degree of degradation is hence a very important requirement.

An object of our invention is the production of low-substituted cellulose ethers. Another object is to prepare low-substituted cellulose ethers which are alkali-soluble and which are of a uniformly low degree of degradation and of a correspondingly high degree of viscosity. A further object is to provide a method by which low-substituted cellulose ethers of a uniformly low degree of degradation can be prepared in a simple, economical and reproducible manner. A still further object is an accurate method of controlling the degree of degradation of a cellulose ether during its preparation, in a manner which overcomes the disadvantages of the prior art methods pointed out above. These and other objects will more clearly appear hereinafter.

These objects are accomplished by forming a cellulose etherification mixture containing the quantities of cellulose, alkali, water and etherifying agent required for the subsequent etherification to give a low-substituted derivative and limiting the quantity of air present in the alkaline cellulose reaction mass during the etherification by means of complete or partial exclusion of air from the reaction mass by application of mechanical pressure thereto. Thus, we have found that if an alkaline cellulose reaction mixture is subjected to pressure during the reaction, sufficient to express at least a large proportion of entrained air, the degradation of the cellulose is reduced and the degree of degradation can be controlled by the degree to which the cellulose reaction mixture is compressed. By so doing we are able to control the oxidative degradation of cellulose during the reaction independently of the substituting reaction.

In practice the process of the invention is most conveniently carried out with cellulose reaction mixture in sheet form, but it can also be carried out with shredded or bulk reaction mixtures. Such reaction mixtures in sheet form can be prepared by steeping cellulose in a mixture of caustic alkali and etherifying agents, as described in co-pending application Serial No. 7850, or by impregnation of alkali cellulose in sheet form, as described in co-pending application Serial No. 34,133. Broadly the invention covers the exclusion of part or all, or substantially all of the air from a cellulose etherification reaction mass during the reaction period by mechanical pressure. The impregnated cellulose is compressed to remove excess liquid and is then either maintained at minimum volume during etherification, or is allowed to expand to take in a predetermined volume of air which may be only a few per cent and preferably does not exceed 50% of the minimum volume occupied by the alkali cellulose during the pressing step. When the reaction is carried out on such a compressed mass, the degree of degradation is reduced considerably. In its preferred form, it is desirable to operate the process of the invention so that air is substantially and completely excluded by mechanical pressure. By this modification, products of very low degrees of degradation and of excellent uniformity are obtained. Where air has been substantially completely excluded, it is obvious that oxidative degradation will be slight. Air can be excluded completely either by compression of previously steeped and pressed sheets or shredded reaction mixture to a point where free liquor begins to flow from the mass or by binding the sheets after steeping in an alkali bath containing etherifying reagents and pressing without releasing pressure. Binding without allowing expansion gives bundles of slightly smaller volume than bundles obtained by pressing, expanding and then recompressing until free liquor appears.

The process of this invention is carried out as follows: The cellulose in sheets or in bulk form is steeped in an aqueous caustic alkali solution in which the etherifying agent is preferably also dissolved. After the cellulose is thoroughly impregnated, the excess solution is drained off and the sheets are pressed together until a definite predetermined weight is reached. It is most convenient to control the pressing operation by pressing a given charge of cellulose, for example, a given number of sheets of cellulose, to a definite thickness which previous experience has shown to leave the correct amount of liquor in the cellulose. If it is desired to produce a cellulose ether of high or maximum viscosity, the pressed material is clamped in place by steel plates which allow no expansion when the pressed material is removed from the press. If a cellulose ether of low or medium viscosity is desired, the bundle is allowed to expand (which occurs when pressure is released due to the springy nature of compressed cellulose) until the volume of air required for the subsequent degradation has been absorbed. In any case the amount of compression involved is substantially greater than is brought about by the self-compression of the reaction mass due to its own weight. The expanded bundle is then clamped between steel plates so that no further expansion is possible and removed from the press. Any suitable type of clamps may be used for binding the sheets together. The steel plates used in the pressing step may be used as the top and bottom of the bundle. The firmly bound bundle is then stored for a period sufficient to complete the reaction between the cellulose and etherifying agent. After completion of the reaction, the clamps are loosened and the sheets of cellulose removed. The product can then be purified or applied directly to any desired use.

In another method of producing ether of medium or low viscosity, the above procedure may be modified somewhat as follows: In place of expanding the bundle to absorb the quantity of air necessary for the degree of degradation desired, the bundle is maintained in the clamps and under the maximum pressure until the etherification reaction, unaccompanied by degradation, is completed. After the reaction is completed, the clamps are loosened and the sheets are removed, and coarsely shredded or even only momentarily separated to allow penetration of air into the fibers, and then are stored at a constant temperature for a sufficient length of time to degrade the product and thus lower its viscosity to the desired value.

During this aging step the cellulose reacts with oxygen of the air. Very little oxygen is required to degrade a cellulose derivative and, therefore, once the cellulose is thoroughly permeated with air, the only conditions which need to be controlled to give any particular viscosity are time and temperature. Since these factors are easily and conveniently controlled in our process, this process is particularly suitable for producing high viscosity cellulose derivatives of any given high viscosity.

When cellulose derivatives are aged in a moist condition in the presence of air and an alkali such as sodium hydroxide, the viscosity drops. When the material being aged is in solution, the process is referred to as "ripening". The rate at which the viscosity decreases at a given time is directly proportional to the viscosity of the cellulose derivative at that time. Thus, a derivative of high viscosity ages very rapidly in the presence of air and caustic, as measured by the drop in viscosity, but the decrease is less and less rapid as the viscosity becomes lower. On aging a number of samples of a given derivative of different viscosities, all the viscosities will approach the same value but the high viscosity materials will approach this minimum viscosity faster than the lower viscosity samples. This is also true for caustic solutions of cellulose ethers ripened in contact with the air. This means that in producing low viscosity materials, there is no need for extremely accurate methods of controlling viscosity. However, since the viscosity of high viscosity materials changes very rapidly, an extremely accurate method of control is necessary to obtain cellulose derivatives of high and uniform viscosity. The present process affords such a method of controlling the viscosity of the alkali-soluble cellulose ethers. The following examples are illustrative of the process.

*Example I*

Three lots of steeping solution were prepared by mixing 1650 parts of sodium hydroxide with 6700 parts of water, cooling, and adding 1050 parts of sodium methyl sulfate. One thousand (1000) parts of sulfite wood cellulose in sheets 9.5″ x 10″ were steeped in each of these solutions for one hour at 25° C. The sheets were then treated as follows:

(a) The sheets from one steep were placed in an hydraulic press between ¼″ iron plates and pressed to a height of 1.875″ (all height measurements do not include plates). The bundle so formed, including the plates, was clamped so that no expansion could take place and the bundle allowed to react by heating to 65° C. in an atmosphere of air for sixteen hours. The sheets were purified by steeping in warm water until neutral to phenolphthalein. A 5% solution of the methyl cellulose in 7% sodium hydroxide was made by cooling to −7° C. The solution was found to possess a viscosity of about 290 poises.

(b) One lot of the steeped material was placed in an hydraulic press between ¼″ iron plates and pressed to a height of 1.875″ and allowed to drain freely. Pressure was then released until the sheets had expanded to a height of 2.375″. At this height the sheets were bound between the plates so that no further expansion could take place. The bound sheets were caused to react by heating in an atmosphere of air at 65° C. for sixteen hours. The sheets were purified as in (a) above and were then made into a solution containing 5% methyl cellulose and 7% sodium hydroxide by cooling to −7° C. The solution was found to have a viscosity of 20 poises (at 25° C.). A duplicate preparation was found to have a viscosity of 21 poises.

(c) Another lot of the steeped material was placed in a press and pressed to a height of 1.875″, after which it was allowed to expand fully. The height to which the material expanded under its own internal pressure was 4.25″. The sheets were placed between iron plates except that no pressure was applied, and they were allowed to react for sixteen hours at 65° C. in an atomsphere of air. The viscosity of the resulting material, when made into a 5% solution in 7% sodium hydroxide, was 1.5 poises.

The weight of the pressed material in Examples I (a), (b) and (c) was approximately 3300 parts.

Examples I (a) and (b) illustrate the ease with which the viscosity can be controlled by the process of this invention. These are to be compared with Example I (c) where the process of this invention was not applied.

*Example II*

One hundred sixty (160) parts of sulfite cellulose were steeped in a 20% caustic solution at 25° C. and after one hour were pressed to 500 parts. One hundred thirty-four (134) parts of sodium methyl sulfate were shredded into the mixture in a Werner-Pfleiderer shredder for four hours. One-half of the product was placed in a glass jar and allowed to stand for ten days at 36° C. at which time etherification was substantially complete. The resulting product was found to be soluble in 7% sodium hydroxide at 5% concentration after cooling to 5° C. The viscosity of the resulting solution was 2 poises. The second portion of the reaction mixture was placed in a press cylinder and pressed until liquid began to be drained from the cylinder. At this point application of pressure was discontinued and the press cylinder clamped so that no expansion could take place. The press cylinder was stored for ten days at 36° C. The pressed material was then purified by washing with water until alkali-free and, after drying, was dissolved to give a 5% solution in 7% sodium hydroxide. The resulting solution was very much more viscous than that obtained from the material stored without application of pressure, being above 30 poises compared with about 2 poises for a product made without compression.

The above procedure is particularly applicable to cellulose etherification mixtures composed of loose or unfelted fibers such as can be obtained by steeping bulk cellulose in a solution of etherifying agent in sodium hydroxide and centrifuging.

*Example III*

Twenty-one hundred (2100) parts of wood pulp, in the form of sheets 9.5″ x 10″ in size, were steeped for one hour in the following solution:

| | Parts |
|---|---|
| Sodium hydroxide | 4700 |
| Sodium methyl sulfate | 2100 |
| Water | 12000 |

At the end of one hour the excess solution was drained off and the sheets were stacked in a vertical press, the thickness of the stack before pressing being 7⅞ inches. The stack was then pressed to a thickness of 4⅛ inches, corresponding to a press weight ratio (press weight ratio is the ratio of the weight of the steeped and pressed cellulose sheets to the weight of the original dry sheets) of about 4 to 1, and firmly clamped between steel plates. The bundle of impregnated cellulose thus formed was placed in an iron can, loosely covered, and kept at a temperature of about 34° C. for four days. The bundle was then opened and the cellulose coarsely shredded by running through an ice breaker to allow thorough impregnation with air. It was then placed loosely in a can and stored at 25° C. A small sample was washed immediately after the shredding operation by stirring into hot water, then pouring on to a filter and washing with additional hot water until the methyl cellulose was neutral to phenolphthalein. Another sample was washed at the end of one hour, a third sample at the end of two hours, and so on every hour for the first eight hours. A single additional sample was removed and washed at the end of twenty-three hours. The methyl cellulose made by this process containing only 0.07 methyl group per mol of cellulose, cellulose being considered as $C_6H_{10}O_5$, and was also only very slightly degraded. For these reasons it was not soluble in water nor even in caustic solution at room temperature, but was soluble in caustic soda at low temperatures. The following scheme was therefore used to dissolve these samples: Twenty (20) parts of the methyl cellulose were wet with 176 parts of water and allowed to stand one hour. A caustic solution containing 28 parts of sodium hydroxide in 176 parts of water was added to the wet methyl cellulose and the mass stirred thoroughly to obtain a uniform mixture free of lumps and containing 5% methyl cellulose in 7% sodium hydroxide. At this stage the mixture was in the form of an opaque, sticky paste. It was cooled to —10° C. by the use of solid carbon dioxide and finally allowed to warm up to room temperature, whereupon a viscous, clear, liquid solution resulted.

Solutions were thus made of the samples described above and the viscosities were determined. In order that all viscosity data would be comparable, the samples, after freezing, were kept for sixteen hours at 25° C. before the viscosities were determined, as it had been observed that the viscosity varied with the age of the solution. The viscosities are shown in the following table:

|  | Poises |
|---|---|
| Initial viscosity (viscosity of sample not aged) | 288 |
| Viscosity of sample aged— |  |
| 1 hour | 132 |
| 2 hours | 110 |
| 3 hours | 96 |
| 4 hours | 62 |
| 5 hours | 54 |
| 6 hours | 47 |
| 7 hours | 54 |
| 8 hours | 32 |
| 23 hours | Less than 10 |

The high viscosity samples prepared in this way are especially valuable as finishing agents for textile fabrics and there is a marked difference in the permanence of the finish obtained with methyl cellulose of a viscosity greater than 100 poises as compared with a sample having a viscosity of under 50 poises.

For sodium methyl sulfate of Example I, one may substitute other etherifying agents such as sodium chloracetate, glycerin chlorhydrin, sodium ethoxy ethyl sulfate or sodium methoxy ethyl sulfate, and thus obtain cellulose glycolic acid, glycerin cellulose, ethoxy ethyl cellulose, or methoxy ethyl cellulose, respectively, of high and uniform viscosity. One may obtain methyl cellulose of high and uniform viscosity, also, by using, instead of sodium methyl sulfate, sodium methyl sulfite, sodium methyl carbonate, or sodium methyl phosphate.

The process may also be operated by first forming alkali cellulose in the form of sheets, impregnating the sheets of alkali cellulose with an etherifying agent, then pressing and binding as described above.

*Example IV*

Twenty-two hundred (2200) parts of sulfite wood pulp, in the form of sheets 9.5" x 10", were steeped for one hour in the following solution:

|  | Parts |
|---|---|
| Sodium hydroxide | 3300 |
| Sodium methyl sulfate | 2100 |
| Water | 13400 |

At the end of one hour the excess solution was drained off and the cellulose sheets pressed to a thickness of 4⅞ inches, corresponding to a press weight ratio of about 3.7 to 1, then firmly bound so that no expansion occurred when the press was released. The bound cellulose was placed in a can and heated sixteen hours at 65° C. At the end of this time the sheets were unbound and placed loosely in a can and stored at 25° C. One sample was removed immediately and washed free of caustic, another sample after aging four hours, a third after aging eight hours, etc., until twelve samples had been removed at the end of forty-four hours. The viscosities of these samples are shown in the following table:

|  | Poises |
|---|---|
| Initial viscosity (viscosity of sample not aged) | 300 |
| Viscosity of sample aged— |  |
| 4 hours | 252 |
| 8 hours | 215 |
| 12 hours | 182 |
| 16 hours | 155 |
| 20 hours | 135 |
| 24 hours | 120 |
| 28 hours | 122 |
| 32 hours | 84 |
| 36 hours | 52 |
| 40 hours | 40 |
| 44 hours | 40 |

The operations of this invention may be carried out in any suitable equipment. The most essential step is that of binding or maintaining the bundles of cellulose in pressed condition by any other suitable expedient after pressing and this step will necessitate some means of clamping the sheets firmly together. Otherwise the standard equipment of the viscose rayon industry may be used. A very convenient apparatus for the steeping and pressing is that known as a steeping press and is described in "The Rayon Industry" by Avram, pages 445 and 446.

If proper precautions are taken, iron apparatus may be used throughout, since iron is not appreciably corroded by the caustic solutions employed. However, other metals may be used instead of iron, and nickel is especially satisfactory.

It is very important in carrying out the steps of this invention that no harmful impurities contaminate the steeping solution. Impurities in the steeping liquor may affect the rate of degradation of the cellulose derivative, and unless the impurity is always present in the same concentration it will be impossible to obtain cellulose derivatives of uniform viscosities. For this reason it is desirable to use a constant source of raw materials for operation of the present invention. It is especially important that the caustic soda be of constant purity. However, anyone skilled in the art of making alkali-soluble cellulose derivatives will have no difficulty in producing cellulose derivatives of high and uniform viscosity by the process of the present invention.

The process of the invention is applicable broadly to the preparation of low-substituted cellulose derivatives. That is, cellulose derivatives containing up to one mol substituent per glucose unit of cellulose. It is particularly applicable to the preparation of low-substituted cellulose ethers which are soluble in aqueous solutions of alkali. In general, it can be applied to any alkali cellulose reaction mass which contains no solvent or very low proportions of solvent. This includes the preparation of low-substituted alkyl ethers of cellulose, hydroxyalkyl ethers of cellulose, carboxyalkyl ethers of cellulose, and alkoxyalkyl ethers of cellulose. It particularly includes methyl and ethyl cellulose, glycol cellulose, and cellulose glycolic acid ether. In general, the procedures used in carrying out our invention are essentially the same as those used for any other low-substituted cellulose ether reaction, except that during the etherification stage, after mixing of the cellulose with alkali and etherifying agent, the quantity of air present is restricted by mechanical pressure.

The invention is particularly suited to the preparation of cellulose derivatives of a high degree of polymerization, particularly those derived from etherifying agents which are of low reactivity and which require a long time for reaction. It is especially applicable to the preparation of high viscosity alkali-soluble cellulose derivatives such as the methyl, glycol, and glycolic acid ethers.

This invention provides a simple and inexpensive way in which the degree of degradation of cellulose ethers may be controlled. It avoids the necessity of using inert gases to prevent depolymerization, thus eliminating a costly procedure. By its use a whole series of cellulose compounds of better physical properties can be made available at a lower cost than previous prior art processes would permit. The process is convenient to use and easily varied to give ethers of any desired degree of degradation.

The above description and examples are for purposes of illustration only, it being understood that all obvious variations falling within the spirit of the invention as defined in the appended claims, are to be included in the scope thereof.

We claim:

1. A process for the preparation of low-substituted cellulose ethers which comprises mixing a cellulosic material with a solution of an etherifying agent and a caustic alkali, placing the mixture under mechanical pressure to remove excess solution, and allowing the reaction to proceed to the desired degree in the presence of a controlled amount of entrained air, the amount of air in said material being controlled by maintaining the material under suitable mechanical pressure during the period of reaction, said pressure ranging from that sufficient to exclude substantially all of the air to that sufficient to maintain said material at a volume not over 50% in excess of the minimum volume occupied by said material during the pressing step.

2. In the process of preparing low-substituted cellulose ethers wherein cellulosic material is steeped in aqueous alkali solution of etherifying agent and the excess solution is pressed out, the improvement which comprises controlling the amount of air in the pressed cellulosic material by maintaining said cellulosic material under mechanical pressure sufficient to exclude all but the desired amount of air until reaction is complete, said pressure ranging from that sufficient to exclude substantially all of the air to that sufficient to maintain said material at a volume not over 50% in excess of the minimum volume occupied by said material during the pressing step.

3. A process according to claim 2 wherein the reaction is carried out while maintaining said cellulosic material under mechanical pressure sufficient to exclude substantially all of the air, and then releasing the pressure and degrading the cellulose ether to the desired degree.

4. A process for the preparation of low-substituted cellulose ethers which comprises impregnating cellulose with an aqueous solution of caustic soda and etherifying agent, mechanically pressing the impregnated cellulose until substantially all of the entrained air is excluded, partially releasing the pressure to allow the impregnated cellulose to expand until the volume of air required for the degree of degradation desired has been absorbed, said expansion not to exceed 50% of the minimum volume occupied by the impregnated cellulose during the pressing step, stopping the expansion at such desired point, maintaining the pressure at such point until reaction is completed.

5. A process for the preparation of low-substituted cellulose ethers which comprises impregnating sheets of cellulose with an aqueous solution of caustic soda and an etherifying agent, pressing the sheets together to remove excess solution, controlling the amount of air entrained in said impregnated sheets by binding said sheets together under a pressure sufficient to exclude all but the desired amount of air, said amount of air ranging from substantially zero to not over 50% of the minimum volume occupied by the sheets during the pressing step, and storing the bound sheets until etherification is substantially complete.

6. A process according to claim 5 wherein the solution comprises essentially an alkali metal salt of an alkyl sulfuric acid dissolved in aqueous caustic soda.

7. A process according to claim 5 wherein the solution comprises essentially sodium methyl sulfate dissolved in aqueous caustic soda.

8. A process according to claim 5 wherein the pressure maintained is sufficient to exclude substantially all air during the etherification reaction and the product is then degraded to the desired viscosity.

ROBERT W. MAXWELL.
JOSEPH HARREL SHIPP.